(12) United States Patent
Kim et al.

(10) Patent No.: US 11,400,864 B2
(45) Date of Patent: Aug. 2, 2022

(54) FRONT STORAGE APPARATUS FOR VEHICLE

(71) Applicants: HYUNDAI MOTOR COMPANY, Seoul (KR); KIA CORPORATION, Seoul (KR)

(72) Inventors: Hyun Wook Kim, Ansan-si (KR); Byung Jin Ahn, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/319,516

(22) Filed: May 13, 2021

(65) Prior Publication Data

US 2022/0009419 A1    Jan. 13, 2022

(30) Foreign Application Priority Data

Jul. 7, 2020   (KR) .......................... 10-2020-0083159

(51) Int. Cl.
*B60R 5/02*   (2006.01)
*B62D 25/08*   (2006.01)
*B62D 25/12*   (2006.01)

(52) U.S. Cl.
CPC .............. *B60R 5/02* (2013.01); *B62D 25/087* (2013.01); *B62D 25/12* (2013.01)

(58) Field of Classification Search
CPC ....... B60R 5/02; B60R 13/013; B62D 25/087; B62D 25/105; B62D 25/12
USPC ...................................... 296/37.1, 76, 190.11
See application file for complete search history.

(56) References Cited

U.S. PATENT DOCUMENTS

| | | | |
|---|---|---|---|
| 8,388,047 B2 * | 3/2013 | Schmidt ............... | B62D 25/087 296/203.02 |
| 11,208,046 B2 * | 12/2021 | Liu ...................... | B62D 25/087 |
| 2021/0284242 A1 * | 9/2021 | Yamaoka .............. | B60R 13/013 |

FOREIGN PATENT DOCUMENTS

DE   102019001342 A1 *   8/2020
DE   102019004010 A1 * 12/2020   ............... B60R 5/02

* cited by examiner

*Primary Examiner* — Jason S Daniels
(74) *Attorney, Agent, or Firm* — McDonnell Boehnen Hulbert & Berghoff LLP

(57) ABSTRACT

A front storage apparatus for a vehicle includes a vehicle hood pivotally connected to the front of a vehicle body, a frunk located under the vehicle hood, a frunk lid pivotally connected to the frunk, and a connecting rod operatively connecting the frunk lid and the vehicle hood.

8 Claims, 6 Drawing Sheets

FRONT STORAGE APPARATUS FOR VEHICLE

CROSS REFERENCE TO RELATED APPLICATIONS

This application is based on and claims the benefit of priority to Korean Patent Application No. 10-2020-0083159, filed on Jul. 7, 2020, in the Korean Intellectual Property Office, the disclosure of which is incorporated herein in its entirety by reference.

TECHNICAL FIELD

The present disclosure relates to a front storage apparatus for a vehicle including a frunk which is covered or uncovered by a frunk lid, and more particularly, to a front storage apparatus for a vehicle capable of facilitating the opening and closing of the frunk lid as the frunk lid is operatively connected to a vehicle hood.

BACKGROUND

Vehicles that are not equipped with an internal combustion engine, such as electric vehicles, include a frunk, and the frunk is defined as a trunk located in the front of the vehicle. The frunk has a storage space that provides room for luggage and a frunk opening that allows access to the storage space.

Some electric vehicles include a frunk lid operating independently of a vehicle hood. The frunk lid may be pivotally connected to the frunk, and the frunk lid may allow access to the frunk. However, the opening of an existing frunk lid is complex. Specifically, as a hood release lever located in the interior of the vehicle is unlocked, a lock of the vehicle hood is released, and then a safety release lever located in the front of the vehicle hood is unlocked, which allows the vehicle hood to open. That is, as the existing frunk lid is not operatively connected to the vehicle hood, the opening and closing operation of the frunk lid is complex.

Other electric vehicles remove the frunk lid, and are configured to allow the vehicle hood to directly cover or uncover the frunk opening of the frunk. In electric vehicles from which the frunk lid is removed, a sealing structure is mounted on an edge of the frunk opening of the frunk to seal a storage space of the frunk. However, as the vehicle hood contacts the sealing structure of the frunk in a state in which the vehicle hood is closed, an impact absorption space (buffer space) for the vehicle hood cannot be secured, so the Euro NCAP pedestrian protection score is lowered.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a front storage apparatus for a vehicle facilitating the opening and closing operation of a frunk lid as the frunk lid is operatively connected to a vehicle hood.

According to an aspect of the present disclosure, a front storage apparatus for a vehicle may include a vehicle hood pivotally connected to a front of a vehicle body, a frunk located under the vehicle hood, a frunk lid pivotally connected to the frunk, and a connecting rod operatively connecting the frunk lid and the vehicle hood.

The connecting rod may convert a pivotal motion of the vehicle hood into a pivotal motion of the frunk lid.

A top end of the connecting rod may be rotatably connected to the vehicle hood, and a bottom end of the connecting rod may be rotatably connected to the frunk lid.

The connecting rod may include a pair of first pivot pins protruding from a top end of the connecting rod, and a pair of second pivot pins protruding from a bottom end of the connecting rod.

The pair of first pivot pins may oppose each other in relation to the top end of the connecting rod, and the vehicle hood may include a first pivot bracket on which the pair of first pivot pins are rotatably mounted.

The first pivot bracket may include a first attachment base attached to a bottom surface of the vehicle hood and a pair of first pivot lugs protruding downwardly from the first attachment base, and each first pivot lug may have a first pivot opening in which each first pivot pin is rotatably received.

The pair of second pivot pins may oppose each other in relation to the bottom end of the connecting rod, and the frunk lid may include a second pivot bracket on which the pair of second pivot pins are rotatably mounted.

The second pivot bracket may include a second attachment base attached to a top surface of the frunk lid and a pair of second pivot lugs protruding upwardly from the second attachment base, and each second pivot lug may have a second pivot opening in which each second pivot pin is rotatably received.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
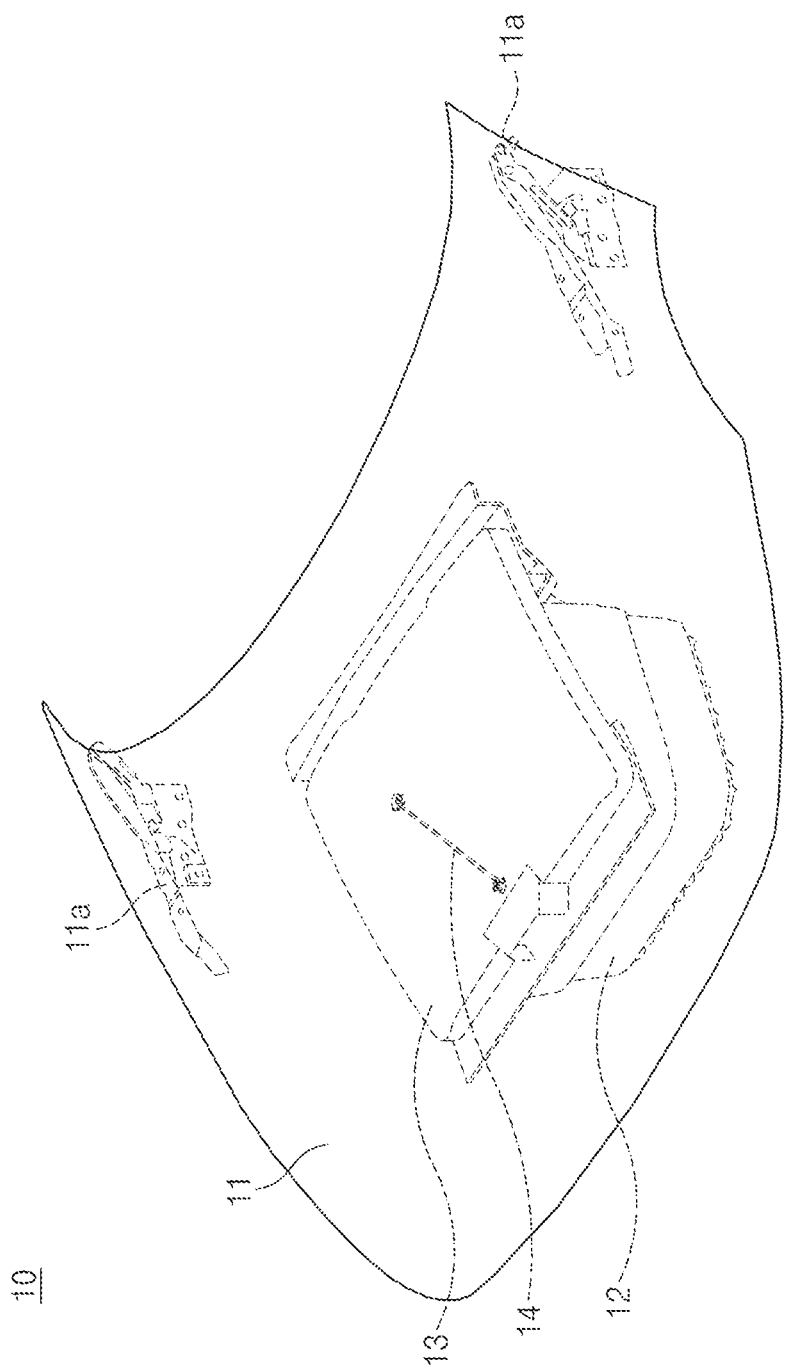
FIG. 1 illustrates a perspective view of a front storage apparatus for a vehicle according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
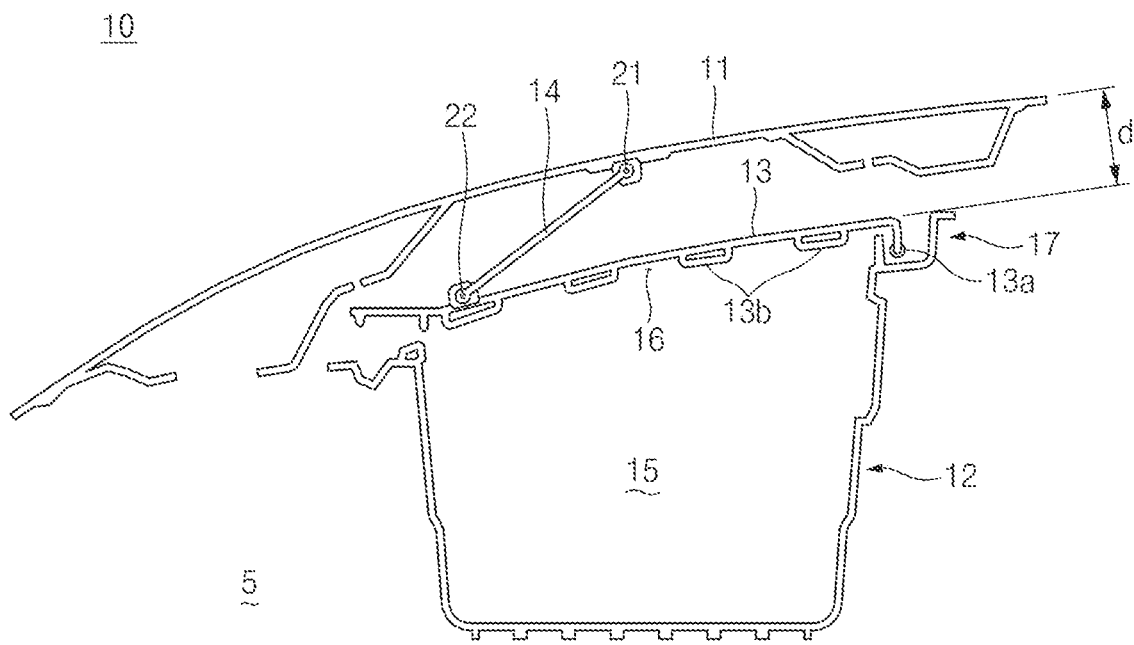
FIG. 2 illustrates a longitudinal sectional view of a front storage apparatus for a vehicle according to an exemplary embodiment of the present disclosure, in a state in which a vehicle hood and a frunk lid are in a closed position.
Figure 3:
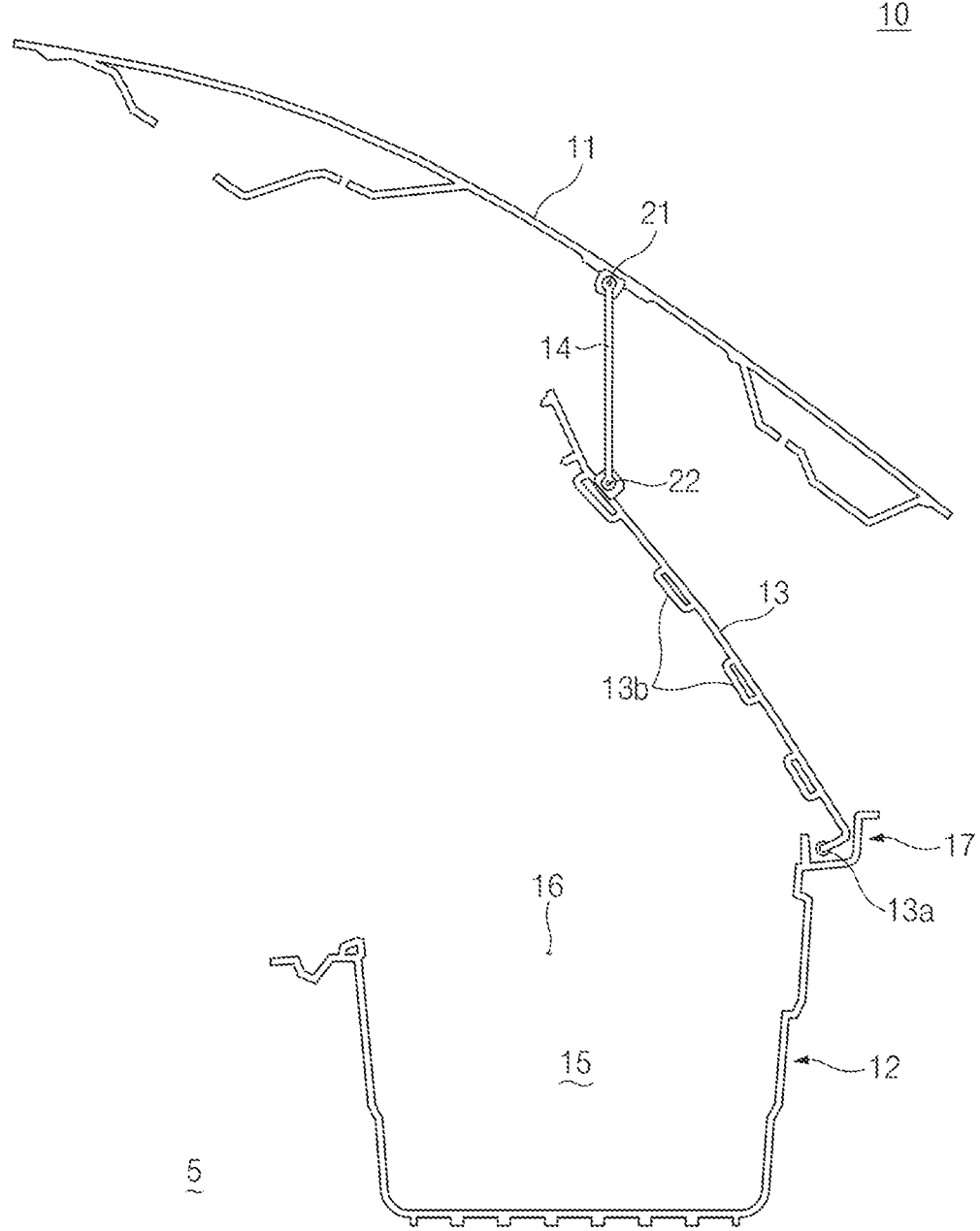
FIG. 3 illustrates a longitudinal sectional view of a front storage apparatus for a vehicle according to an exemplary embodiment of the present disclosure, in a state in which a vehicle hood and a frunk lid are in an open position.

Referring to FIGS. 1 to 3, a front storage apparatus 10 for a vehicle according to an exemplary embodiment of the present disclosure may include a vehicle hood 11 pivotally connected to a vehicle body, a frunk 12 located under the vehicle hood 11, a frunk lid 13 pivotally connected to the frunk 12, and a connecting rod 14 operatively connecting the frunk lid 13 and the vehicle hood 11.

The vehicle may have a front compartment 5 located in the front thereof. In an electric vehicle, a power drive including an electric motor, an inverter, and the like may be disposed in the front compartment 5. The vehicle hood 11 may be pivotally connected to the vehicle body by a pair of hood hinge assemblies 11a. As the vehicle hood 11 pivots, the vehicle hood 11 may move between a closed position in which the vehicle hood 11 covers the front compartment 5 and an open position in which the vehicle hood 11 uncovers the front compartment 5.

The frunk 12 may be located under the vehicle hood 11, and the frunk 12 may be disposed in an upper area of the front compartment 5. Referring to FIG. 2, the frunk 12 may include a storage space 15 that provides room for luggage, and a frunk opening 16 that allows access to the storage space 15. The frunk opening 16 may be formed in a top end of the frunk 12, and the frunk opening 16 may be defined by an upper rim 17.

The frunk lid 13 may be pivotally connected to the upper rim 17 of the frunk 12 through a pivot pin 13a. As the frunk lid 13 pivots, the frunk lid 13 may move between a closed position in which the frunk lid 13 covers the frunk opening 16 and an open position in which the frunk lid 13 uncovers the frunk opening 16. The frunk lid 13 may have a plurality of ribs 13b, and the plurality of ribs 13b may be provided on a bottom surface of the frunk lid 13. Each rib 13b may extend in a longitudinal direction or width direction of the frunk lid 13, and thus stiffness and strength of the frunk lid 13 may be improved by the plurality of ribs 13b.

The connecting rod 14 may operatively connect the frunk lid 13 to the vehicle hood 11, thereby converting a pivotal motion of the vehicle hood 11 into a pivotal motion of the frunk lid 13. Specifically, a top end of the connecting rod 14 may be rotatably connected to a bottom surface of the vehicle hood 11, and a bottom end of the connecting rod 14 may be rotatably connected to a top surface of the frunk lid 13.

Figure 4:
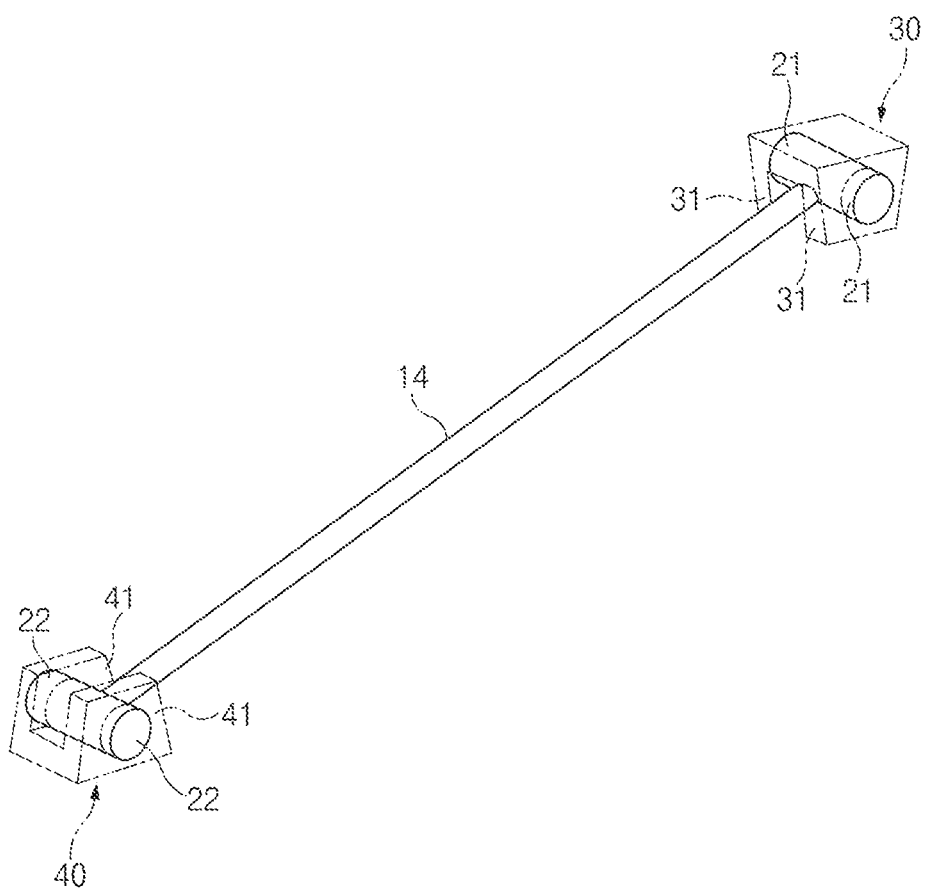
FIG. 4 illustrates a perspective view of a connecting rod of a front storage apparatus for a vehicle according to an exemplary embodiment of the present disclosure.

Referring to FIG. 4, the connecting rod 14 may include a pair of first pivot pins 21 protruding from the top end thereof, and a pair of second pivot pins 22 protruding from the bottom end thereof. The pair of first pivot pins 21 may oppose each other in relation to the top end of the connecting rod 14, and the pair of second pivot pins 22 may oppose each other in relation to the bottom end of the connecting rod 14.

Figure 5:
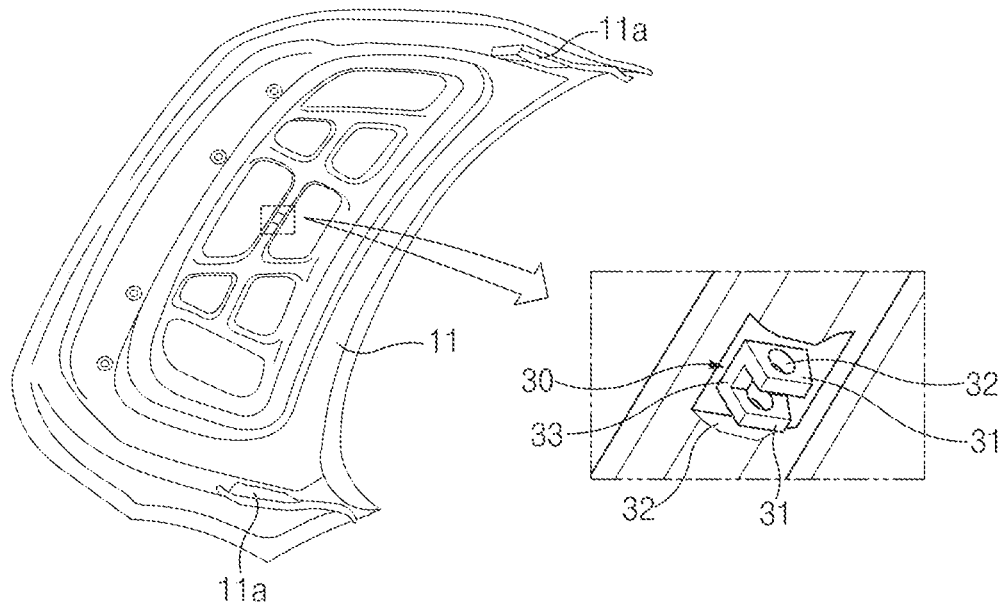
FIG. 5 illustrates a bottom perspective view of a vehicle hood of a front storage apparatus for a vehicle according to an exemplary embodiment of the present disclosure.

Referring to FIG. 5, the vehicle hood 11 may include a first pivot bracket 30 on which the first pivot pins 21 of the connecting rod 14 are rotatably mounted. The first pivot bracket 30 may include a first attachment base 33 attached to the bottom surface of the vehicle hood 11 and a pair of first pivot lugs 31 protruding downwardly from the first attachment base 33. The pair of first pivot lugs 31 may be spaced apart from each other. Each first pivot lug 31 may have a first pivot opening 32, and each first pivot pin 21 may be rotatably received in the corresponding first pivot opening 32.

Figure 6:
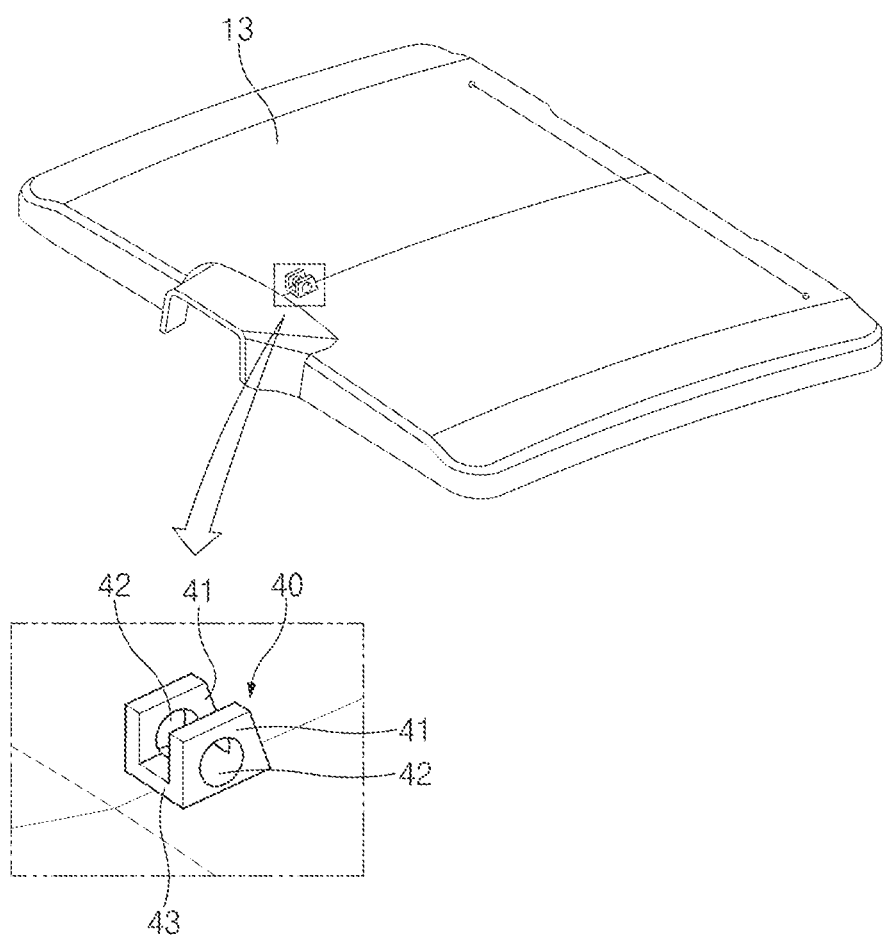
FIG. 6 illustrates a top perspective view of a frunk lid of a front storage apparatus for a vehicle according to an exemplary embodiment of the present disclosure.

Referring to FIG. 6, the frunk lid 13 may include a second pivot bracket 40 on which the second pivot pins 22 of the connecting rod 14 are rotatably mounted. The second pivot bracket 40 may include a second attachment base 43 attached to the top surface of the frunk lid 13 and a pair of second pivot lugs 41 protruding upwardly from the second attachment base 43. The pair of second pivot lugs 41 may be spaced apart from each other. Each second pivot lug 41 may have a second pivot opening 42, and each second pivot pin 22 may be rotatably received in the corresponding second pivot opening 42.

Referring to FIG. 2, as the vehicle hood 11 is closed, the top end of the connecting rod 14 may move downward along the same trajectory as that of the vehicle hood 11, and the bottom end of the connecting rod 14 may move downward along the same trajectory as that of the frunk lid 13, and accordingly the frunk lid 13 may be closed. In particular, when the vehicle hood 11 is closed, the first pivot pins 21 of the connecting rod 14 may rotate with respect to the vehicle hood 11 and the second pivot pins 22 of the connecting rod 14 may rotate with respect to the frunk lid 13 simultaneously, and thus the connecting rod 14 may be located in a diagonal position. Specifically, when the vehicle hood 11 is closed, the first pivot pins 21 of the connecting rod 14 may be positioned higher than the second pivot pins 22 of the connecting rod 14, and the first pivot pins 21 of the connecting rod 14 may be positioned behind the second pivot pins 22 of the connecting rod 14. In a state in which the vehicle hood 11 and the frunk lid 13 are closed, the connecting rod 14 may cause the vehicle hood 11 to be spaced apart from the frunk lid 13 by a predetermined distance d, whereby an enough impact absorption space corresponding to the distance d may be provided between the vehicle hood 11 and the frunk lid 13, and thus a head-impact absorption space may be provided in accordance with the European pedestrian regulations.

In particular, when the vehicle hood 11 is closed, the connecting rod 14 may press the frunk lid 13 downwardly so that the frunk lid 13 may tightly contact the upper rim 17 of the frunk 12. Accordingly, sealability between the frunk lid 13 and the frunk 12 may be ensured, thereby preventing entry of foreign materials. The sealability between the frunk lid 13 and the frunk 12 may be kept against vehicle-induced wind (driving wind) or other external impacts, thereby preventing noise and vibration.

Referring to FIG. 3, as the vehicle hood 11 is opened, the top end of the connecting rod 14 may move upward along the same trajectory as that of the vehicle hood 11 and the bottom end of the connecting rod 14 may move upward along the same trajectory as that of the frunk lid 13, and accordingly the frunk lid 13 may be opened. In particular, when the vehicle hood 11 is opened, the first pivot pins 21 of the connecting rod 14 may rotate with respect to the vehicle hood 11 and the second pivot pins 22 of the connecting rod 14 may rotate with respect to the frunk lid 13 simultaneously, and thus the connecting rod 14 may be located in a vertical position. Specifically, when the vehicle hood 11 is opened, the first pivot pins 21 of the connecting rod 14 may be positioned higher than the second pivot pins 22 of the connecting rod 14.

As set forth above, according to exemplary embodiments of the present disclosure, the frunk lid 13 may be operatively connected to the vehicle hood 11 through the connecting rod 14, and the connecting rod 14 may be configured to convert the pivotal motion of the vehicle hood 11 into the pivotal motion of the frunk lid 13. Thus, as the vehicle hood 11 is opened, the frunk lid 13 may be opened, and as the vehicle hood 11 is closed, the frunk lid 13 may be closed. That is, the pivotal motion (the opening and closing operation) of the frunk lid and the pivotal motion (the opening and closing operation) of the vehicle hood 11 may be linked so that the frunk lid may be easily opened and closed, which significantly increase the user's convenience.

According to exemplary embodiments of the present disclosure, the frunk lid 13 may be operatively connected to the vehicle hood 11 through the connecting rod 14, which allow the removal of an open lever, a locking structure, and the like of the frunk lid. Thus, the volume of the frunk 12 may be increased, and the manufacturing cost and weight thereof may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A front storage apparatus for a vehicle, the front storage apparatus comprising:
    a vehicle hood pivotally connected to a front of a vehicle body;
    a frunk located under the vehicle hood;
    a frunk lid pivotally connected to the frunk; and
    a connecting rod operatively connecting the frunk lid to the vehicle hood.

2. The front storage apparatus according to claim 1, wherein the connecting rod converts a pivotal motion of the vehicle hood into a pivotal motion of the frunk lid.

3. The front storage apparatus according to claim 1, wherein a top end of the connecting rod is rotatably connected to the vehicle hood, and a bottom end of the connecting rod is rotatably connected to the frunk lid.

4. The front storage apparatus according to claim 1, wherein the connecting rod includes a pair of first pivot pins protruding from a top end of the connecting rod, and a pair of second pivot pins protruding from a bottom end of the connecting rod.

5. The front storage apparatus according to claim 4, wherein the pair of first pivot pins oppose each other in relation to the top end of the connecting rod, and the vehicle hood includes a first pivot bracket on which the pair of first pivot pins are rotatably mounted.

6. The front storage apparatus according to claim 5, wherein the first pivot bracket includes a first attachment base attached to a bottom surface of the vehicle hood, and a pair of first pivot lugs protruding downwardly from the first attachment base; and
    wherein each first pivot lug has a first pivot opening in which each first pivot pin is rotatably received.

7. The front storage apparatus according to claim 4, wherein the pair of second pivot pins oppose each other in relation to the bottom end of the connecting rod; and
    wherein the frunk lid includes a second pivot bracket on which the pair of second pivot pins are rotatably mounted.

8. The front storage apparatus according to claim 7, wherein the second pivot bracket includes a second attachment base attached to a top surface of the frunk lid, and a pair of second pivot lugs protruding upwardly from the second attachment base; and
    wherein each second pivot lug has a second pivot opening in which each second pivot pin is rotatably received.

* * * * *